United States Patent [19]

Stonestreet et al.

[11] 4,324,202
[45] Apr. 13, 1982

[54] KNOCK DOWN WEATHER AND SALT RESISTANT SALT AND MINERAL FEEDER FOR CATTLE

[76] Inventors: Jimmy B. Stonestreet, Rte. 2A, Box 127, Boyce, Va. 22620; John M. Rohrbaugh, 15125 Braddock Rd., Centerville, Va. 22020

[21] Appl. No.: 240,352

[22] Filed: Mar. 4, 1981

[51] Int. Cl.³ ............................................. A01K 5/01
[52] U.S. Cl. ................................. 119/51 R; 119/61; 119/157
[58] Field of Search .................... 119/51 R, 52 R, 61, 119/157, 58

[56] References Cited

U.S. PATENT DOCUMENTS

| | | | |
|---|---|---|---|
| 2,742,877 | 4/1956 | Stoner | 119/61 |
| 3,137,274 | 6/1964 | Palmer | 119/52 R X |
| 3,324,833 | 6/1967 | Clugston | 119/61 |
| 3,885,524 | 5/1975 | Gregory | 119/58 X |

Primary Examiner—Hugh R. Chamblee
Attorney, Agent, or Firm—Sughrue, Mion, Zinn, Macpeak & Seas

[57] ABSTRACT

A knock down salt and mineral feeder for cattle is formed of two oppositely facing sidewall subassemblies formed by vertical posts of different length, between which pasts span a trough sideboard. A side panel is factory preassembled to the trough sideboard and post. Each rear post bears a vertical mortise slot. The trough sideboard bears an inclined mortise slot. A horizontal mortise slot within the bottom of the trough sidewall extends from the inclined slot of the sideboard to the post vertical slot. A rear wall subassembly is formed by a back panel having a trough backboard fixed thereto bearing tenons on its end fitting within the vertical mortise slots of the rear posts. A horizontal mortise slot within the trough backboard is aligned with the horizontal mortise slots for the sidewall subassemblies. A roof subassembly is formed of a roof panel mounted via a pair of sideboards to the lateral sides of the roof panel. All thread rods project through holes within the trough sideboard, and nuts are threaded on the projecting ends of the rods to lock the rear wall assembly to the sidewall assemblies with trough boards within the slots forming a trough, well to the rear of the open front of the feeder. The rear posts are shorter than the front posts for the sidewall assemblies, and the roof panel is wider than the side panels to provide frontal overhang. The roof subassembly is bolted via the sideboards to the sidewall assembly posts. Runners are bolted to the bottoms of the sidewall posts. A hollow tubular container bearing a face fly treatment liquid carries internally at the bottom a feeder wick. Braided cotton rope wicks are connected to the feeder wicks and extend at right angles thereto and have their ends projecting through holes at the top of the cylinder, to each side thereof, to form an array of liquid applicator rope wicks overlying the open end of the feeder when the cylindrical container is mounted beneath the roof assembly at the overhang.

8 Claims, 6 Drawing Figures

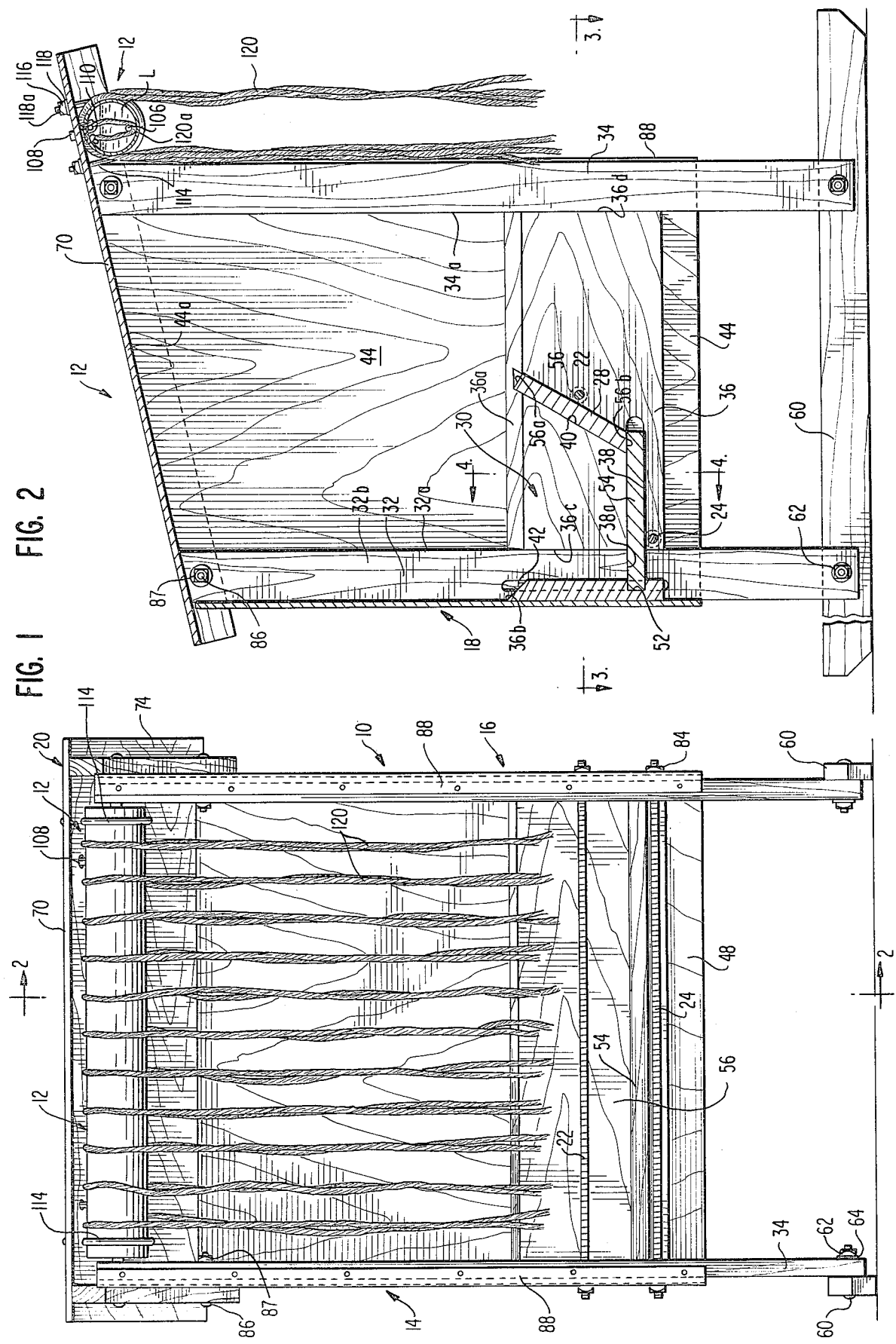

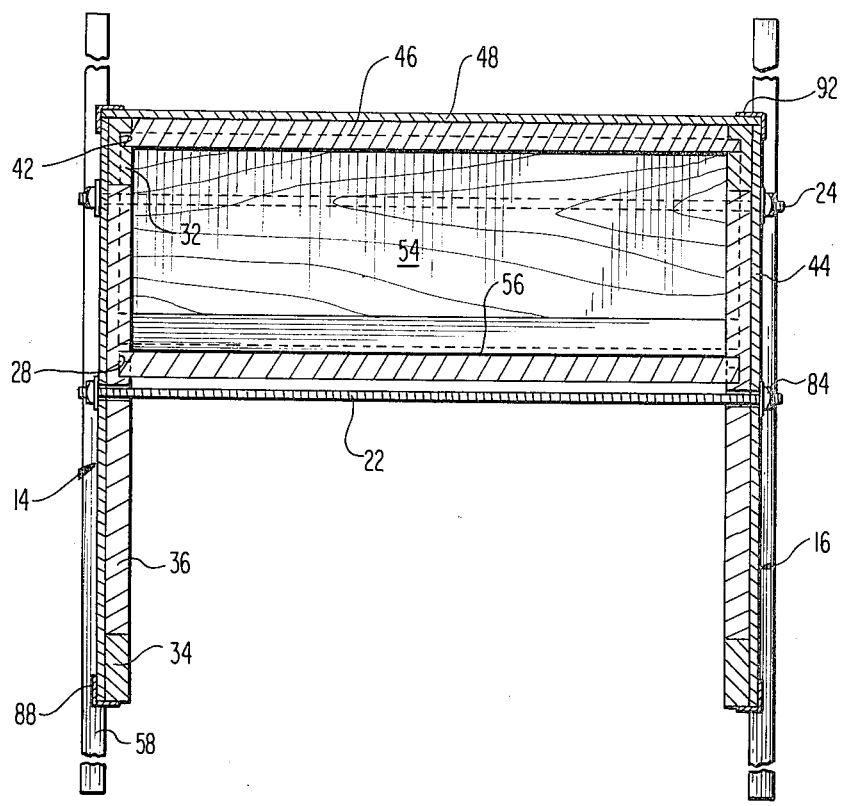
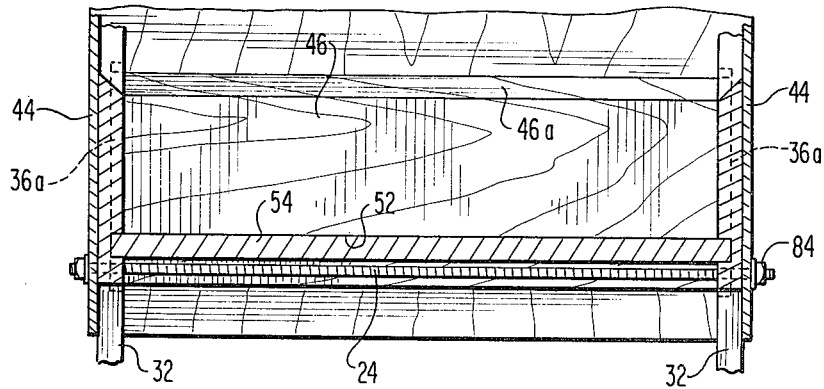
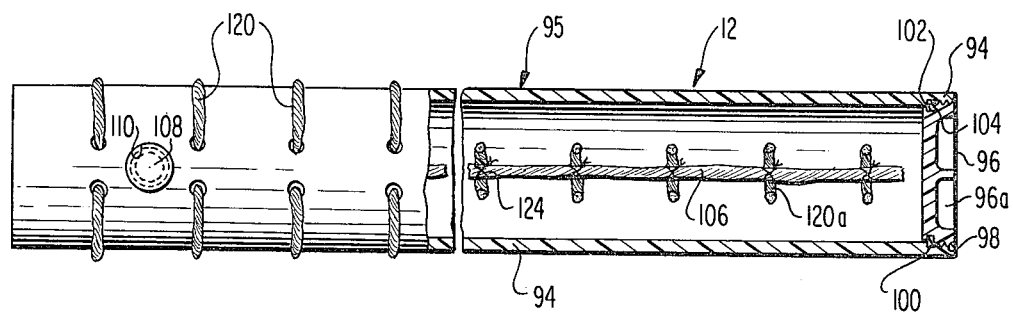

KNOCK DOWN WEATHER AND SALT RESISTANT SALT AND MINERAL FEEDER FOR CATTLE

FIELD OF THE INVENTION

This invention relates to salt and mineral feeders for feeding cattle or the like, and more particularly, to a knock down wooden feeder formed of prebuilt subassemblies integrating the trough to the feeder housing and eliminating the need of nailing the sidewalls, roof and rear wall together during assembly. The invention has further application to an improved form of face fly liquid treating device and its mounting to the feeder.

BACKGROUND OF THE INVENTION

Salt and mineral feeders have been employed for feeding salt and minerals to dairy and beef cattle. Such devices normally comprise an open fronted housing bearing sidewalls, a rear wall and a roof, the units being formed of wood and/or metal such as galvanized sheet metal stock, and being mounted to runners for movement across the field within which the cattle are located. In some versions, due to the tendency for rain to enter the hopper or trough area in which the salt or mineral is dispensed, means have been provided for mounting the trough or hopper or the complete feeder for rotation about a vertical axis, with the unit employing a weather vane or wind vane to insure that the open end faces away from the direction of the wind. Known constructions come fully assembled, cannot be knocked down or dismantled, employ trough members which provide little resistance to rotting due to the corrosive nature of the salt or mineral being fed, provide surfaces where the salt tends to cake, and when formed of galvanized steel or the like, have a tendency to rust out due to the corrosive nature of the salt or other minerals. Where the feeders must be shipped some distance from their point of manufacture, shipment in fully assembled form is costly. Permitting on site assembly from parts requires considerable time and effort and a skilled carpenter or person with some knowledge of carpentry to achieve completion of the assembly from such parts.

It is, therefore, a primary object of the present invention to provide an improved, knockdown, salt and mineral feeder for cattle and the like which is weather and salt resistant, which is formed of premanufactured wooden sub assemblies, and which can be assembled without the necessity for nailing of the parts together.

It is a further object of the present invention to provide an improved known down weather and salt resistant, salt and mineral feeder for cattle and the like, in which the trough bearing the salt or mineral is formed of trough boards integrated into sidewall and rear wall subassemblies to form a highly sealed rugged trough structure remote from the open end of the feeder and resistant to night time dew and rain penetration.

SUMMARY OF THE INVENTION

The knock down weather and salt resistant salt and mineral feeder for cattle and the like comprise two oppositely facing sidewall subassemblies, each sidewall subassembly comprising front and rear vertical posts, an elongated horizontal trough sideboard spanning between said posts and having tenon connected thereto at its ends. The rear post is shorter than the front post and bears a vertical mortise slot on the inside face thereof. A horizontal mortise slot extends from the vertical slot within the rear post and horizontally across a portion of the trough sideboard. An inclined mortise slot is provided within the trough sideboard intersecting the horizontal mortise slot and extending upwardly and outwardly towards the front post of the sidewall assembly. A side panel preferably formed of plywood is fixed to the outside of said posts and the trough sideboard from the bottom of the trough sideboard to the top of the posts. The feeder further comprises a rear wall subassembly which comprises a rear panel, also preferably formed of plywood and corresponding in height to the sidewall assembly sidepanel. A trough rear board is fixed to the inside of the rear panel, extends horizontally across a portion of the same and terminates in tenons at each end which are fitted to the rear posts vertical mortise slots. The width of the rear panel is such that the ends of the rear panel overlies the ends of the respective side panels of the sidewall subassemblies when assembled thereto. The trough rear board includes a horizontal slot within an inner surface facing the open front of the feeder. A horizontal trough bottom board is sized such it has its opposite ends fitting within the horizontal mortise slots of the trough sideboard and a rear edge within a mortise slot of the trough rear board. A trough front board has its ends fitting within the inclined mortise slots of the trough sideboard with a lower longitudinal edge abutting the top of the trough bottom board.

A roof subassembly comprising a roof panel, also preferably formed of plywood and having a length in excess of the width of the rear panel and bearing sideboards at opposite ends thereof, fixed to the bottom of the roof panel, is bolted via the sideboards to the upper ends of the posts of the sidewall subassemblies. Metal rods extending through said sidewalls at said trough sidewalls bearing nuts threaded to the ends of the rods lock the sidewall subassemblies to the rear wall subassembly, and the trough bottom board and front board within respective mortise slots of said trough sideboards and rear board, respectively. Preferably, the upper edge of the trough sideboards are beveled to resist accumulation and caking of salt. Vertical metal flashing strips are provided at the rear and front corners of the feeder to resist moisture intrusion into the area of the joints between the side panels and the posts of the sidewall subassemblies and the area of panel edge overlap for the back panel and side panels.

A face fly liquid treatment device in the form of a hollow cylindrical container is mounted by U-bolts to the bottom of the roof panel and within the open front of the animal feeder. The hollow container, which extends generally the distance between the sidewall subassemblies, bears a plurality of holes within the top of the same on each side thereof. A length of cotton rope functioning as a feeder wick extends the length of the container within the bottom thereof. A plurality of individual feeder liquid treatment wicks project through respective holes on opposite sides of the container and extend downwardly. Their ends, internally of the container, contact the longitudinal feeder wick such that regardless of tilting of the feeder, any liquid within the interior of the container may be fed by capillary action through the feeder wick and to the individual treatment wick. Treatment wicks on the sides of the face fly liquid treatment device may be united and may underlie the feeder wick at the center thereof to readily conduct the liquid by capillary action from the feeder wick to the ends of the treatment wicks, external of the container.

BRIEF DESCRIPTION OF THE DRAWINGS

FIG. 1 is a front elevational view of one embodiment of the improved knock down salt and mineral feeder of the present invention bearing a face fly liquid treatment device, also forming an aspect of the present invention.

FIG. 2 is a vertical sectional view of the feeder of FIG. 1 taken about line 2—2.

FIG. 3 is a horizontal sectional view of the feeder of FIG. 1 taken about line 3—3.

FIG. 4 is a vertical sectional view taken about line 4—4 of FIG. 2.

FIG. 5 is a plan view, partially broken away, of the face fly liquid treatment device forming a part of the feeder illustrated in FIG. 1.

DESCRIPTION OF THE PREFERRED EMBODIMENT

Figure 6:
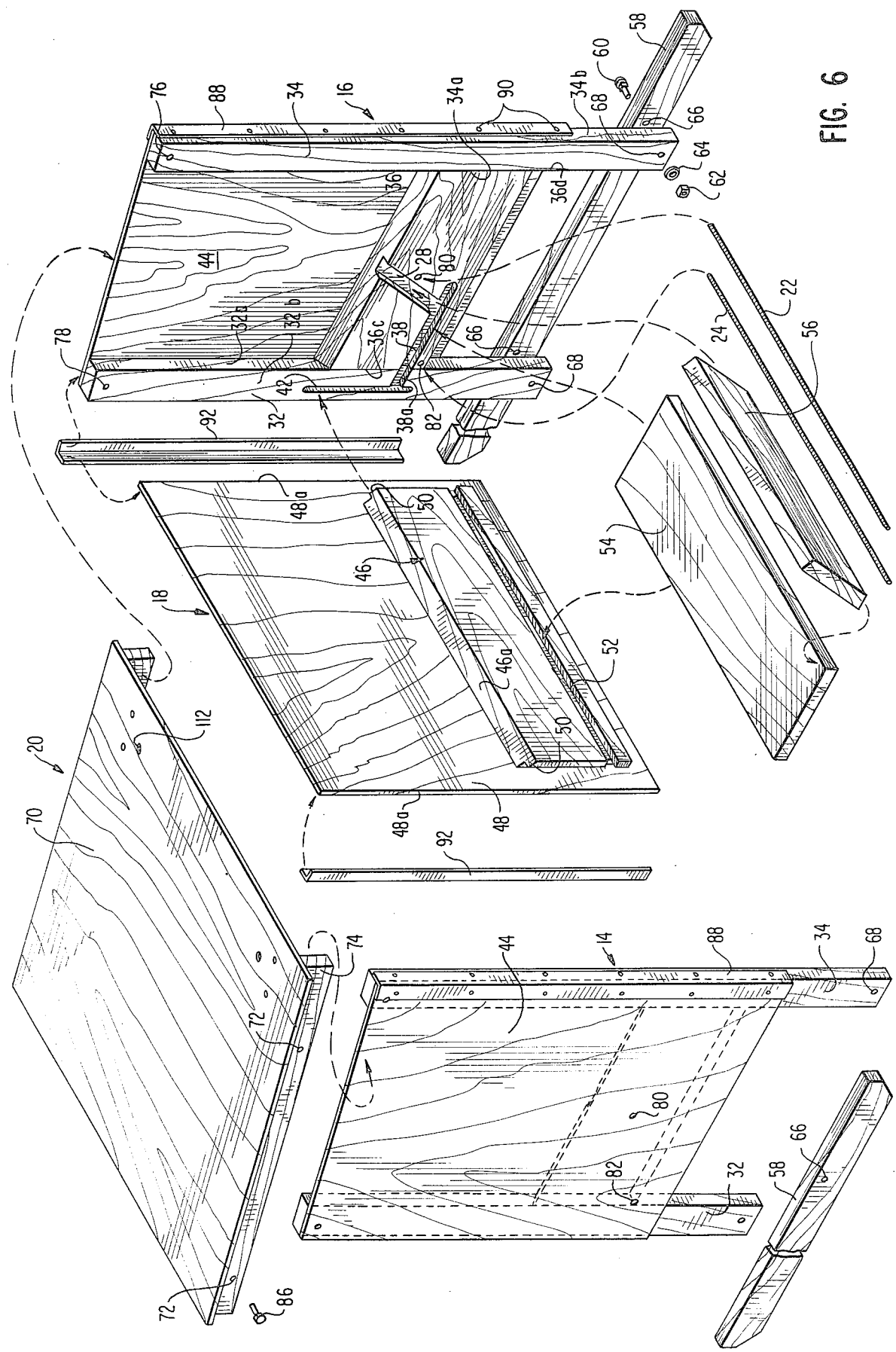
FIG. 6 is an exploded perspective view showing the sequence of assembly of the knock down salt and mineral animal feeder of the present invention.

Referring to the drawings, there is shown a preferred embodiment of the present invention which has two aspects. The first is directed to the knock down, weather and salt resistant, salt and mineral animal feeder, indicated generally at 10, and secondly, to a component thereof, indicated generally at 12 and comprising a face fly liquid treatment device which may be readily mounted thereto or employed as a separate unit in a similarly constructed feeder or positioned within a passage or opening through which a bovine creature or the like may pass, and wherein it must contact the wick strands or rope of that assembly, about its eyes.

With respect to the salt and mineral animal feeder 10, it is constructed of pre-manufactured subassemblies which are in knock down form and which may be readily transported in a stack within a container such as a cardboard box or the like. Thus, the feeder may be assembled on site quickly, within several minutes. This permits its subsequent knock down or disassembly, if needed, for repair purposes, storage and the like. The feeder 10, in terms of subassemblies, comprises two oppositely directed, mirror image sidewall assemblies as at 14 and 16 on the left and right, FIG. 1, a rear wall subassembly indicated generally at 18, and a roof subassembly indicated generally at 20. The subassemblies are quickly bolted together principally by means of threaded rods or Allthreads indicated at 22 and 24, FIG. 1, during which time a separate trough bottom board 26 and trough front board 28 are positioned appropriately so that they fit preformed mortise slots within the subassemblies 14, 16 and 18 to effectively form an open top, sealed trough 30 within which the salt and/or mineral are provided. The feeder is an open front assembly permitting ready access to the trough contents by cattle or the like with the head and shoulders of the cattle penetrating the interior of the feeder defined by the roof subassembly sidewall subassemblies and rear wall sub assembly.

The sidewall assemblies 14 and 16 are the mirror image of each other, and like elements bear like numerical designations.

In that respect, each sidewall subassembly includes a rear post 32 and a front post 34. The front post 34 is higher than the rear post, thus supporting the roof subassembly 20 inclined upwardly and forwardly from rear towards the front, FIG. 2.

As may be appreciated in FIGS. 2, 4 and 6, the area of trough 30 which is subjected to heavy abuse by feeding contact with the animals, must be rugged and resist destruction. Additionally, since the salt and minerals tend to rot and eat into this portion of the feeder, it must be capable of resisting such rot. The invention provides a trough which is essentially sealed from the ambient and which reduces or eliminates cracks within which the salt and minerals can cake to act adversely on these members. In that respect, there is a sidewall subassembly trough sideboard 36 which is fitted to the front and rear posts 34, 32 by a mortise and tenon joint. Mortise slots are provided within the posts 32 and 34 on faces 32a, 34a, respectively, for these members, with the tenon 36a being provided at each end of the trough sideboard 36. The sideboard 36 is further characterized by a beveled upper edge 36b which inclines downwardly and inwardly from the outside face of the sideboard 36 to permit the salt or minerals to slide down and prevent its accumulation along the edge of the sideboard 36. The trough sideboard 36 is mortise slotted or grooved as at 38, horizontally from its rear edge 36c, adjacent its tenon 36a, at that end, towards an opposite front edge 36d to an extent of approximately one-third to one-half the length of the same. The trough sideboard 36 is further provided with an inclined mortise slot or groove 40 which extends upwardly and forwardly from horizontal mortise slot 38 to the beveled edge 36b of the board 36, FIG. 2.

Further, a mortise slot 32 is provided within the innerface 32b of rear post 32, over the full height of the trough sideboard 36. Fixed by nailing, screws or the like to the outside of the vertical posts 32 and 34 and the horizontal or transverse trough sideboard 36, is a side panel 44 which may be formed of weather proof plywood. Side panel 44 has a width so as to span from the rear edge of the rear post 32 to the front edge of the front post 34. Panel 44 is horizontal at the bottom but is provided with an inclined upper edge as at 44a which matches the diagonal cut provided to the upper ends of posts 32 and 34 and has flush therewith.

The rear wall subassembly 18 is composed of two components, a trough back or rear board indicated generally at 46, and a rear panel 48. The rear panel 48 is of a height equal to that of the side panel 44 at its rear and is of a suitable width so as to span across the completed assembly. The trough rear board 46 is of a length which is less than the width of rear panel 40 and is provided with tenons 50 at each end thereof, which tenons fit within mortise grooves or slots 42 within the rear posts 32 of sidewall subassemblies 14 and 16.

Further, the upper edge 46a of the trough rear board 46 is inclined downwardly and inwardly in a similar fashion to that of trough sideboards 36 to prevent the accumulate of salt on the edges of these members. A mortise groove or slot 52 is provided within rear board 46 running the length of the same to allow a mortise and tenon connection with a trough bottom board 54 which is a length slightly in excess of slot 52. The ends of the trough bottom board 54 fit neatly within the mortise slots 38 of the side boards 36 as well as a horizontal extension of that slot, at 38a, within post face 32b to form a proper mortise and tenon joint there between. The trough is completed by a trough front board 56 having a width equal to that of bottom board 54, and being provided with a right angle edge 56a at the top and a beveled edge 56b at the bottom. The beveled edge 56b matches the angle of inclination of slots 28 receiving the ends of the front board 56 of the trough, while right angle edge 56a at the top of the board 56 provides an inclination to prevent the accumulation of salt or minerals on that edge. Lower edge 56b lies flush with the upper surface of the trough bottom board 54 when in contact therewith, being maintained at a proper angle by way of mortise slots 28.

It should be noted that the width of the rear panel 48 and its extension beyond tenons 50 for backboard 46 is such that when the subassemblies are assembled and the feeder partially or fully defined, the side edges 48a of the back panel 48 overlap respectively, the rear edges of side panels 44 of the sidewall subassemblies 14, 16.

The sidewall subassembly posts 32 and 34 are bolted to runners 58 by way of bolts 60, nuts 62 and washers 64, FIG. 6, with the bolt passing through holes 66 within runners 58 and aligned holes 68 within the lower ends of posts 32 and 34. The runners 58 are sufficiently long that that feeder may be readily tilted forwardly or rearwardly on the runner tips, as desired, once assembled.

The feeder 10 proper is completed by a factory preassembled or pre-manufactured roof subassembly much in the manner of subassemblies 14, 16 and 18. In that respect, the roof subassembly 20 is formed of three parts. A roof panel 70 also preferably formed of weatherproof plywood, is rectangular and has a width in excess of the rear panel 48 of the rear wall subassembly 18. Additionally, the length from front to rear of the roof panel 70 is in excess of the width of the sidewall panels 44. Of course, the overhang at the front and back of the feeder in terms of the roof, is determined principally by the location of bolt holes 72 within rails or sideboards 74 which are screwed to the bottoms of the panel 70 along both edges but spaced inwardly from those edges, FIG. 6. The bolt holes 72 are longitudinally spaced to the distance between centers of the front and rear posts 34, 32 of the sidewall subassemblies 14, 16 and match respective holes 76 and 78 within the upper ends of those posts. Preferably, a relatively large overhang is provided for the roof subassembly 20 at the front or open end of the feeder. As may be appreciated, the roof inclines forwardly and upwardly to permit access by the cattle to trough 30, while insuring that the trough 30 is relatively waterfree.

Assembly is effected primarily through the utilization of two "Allthreads", constituting metal rods as at 22, 24, FIG. 6, either threaded over their complete extent, or at least at their ends, which ends project through respective holes 80, 82 within sidewall trough sideboards 36 and side panels 44 at positions beneath but adjacent to front board 56 and bottom board 54, of trough 30. Nuts 84 are threaded to the ends of the rods 22, 24 which when tightened down, to complete the assembly of sidewall subassemblies 14, 16 and rear wall subassembly 18, while forming the completed trough 30. Subsequent or prior thereto, the runners 58 may be applied to the lower ends of posts 32, 34 for each of the sidewall subassemblies. The basic feeder 10 is completed by bolting the roof subassembly 20 to the upper ends of the sidewall subassemblies 16, 18, and specifically posts 32, 34 via a plurality of bolts 86 and nuts 87, the bolts projecting through holes 72 within rails or sideboards 74 and holes 76 and 78 within the upper end of posts 34, 32, respectively.

However, prior to this placement of the roof in position, and bolting it to the sidewall subassemblies 16, 18, flashing strips are provided at the vertical edges of the feeder. Preferably, a first metal flashing strip 88 of L-shaped configuration is nailed by way of nails 90 to the front edge 34b along one side and to the edge of sidewall panel 44 along its other side to seal the gap between these members. The flashing strip 88 extends from a point below the lower edge of sidewall panel 44 to the top of that panel. At the rear corners, second flashing strips 92 of L-shaped configuration are provided and extend vertically so one portion overlies a side edge of the back or rear panel 48, while the other portion covers the vertical edge of sidewall panel 44 where it is nailed to the rear post 32. The assembly of second flashing strips 92 is made after the Allrods 22 and 24 are employed in joining subassemblies 14, 16 and 18.

In an exemplary construction, sideboards 36, rearboard 46 and bottom board 54 of the trough 30, may be formed of 2×12. The front trough board 56 may be formed of a 2×10, while posts 32, 34 may be formed of 2×4, all of the wood and preferably being treated to withstand the elements. Likewise, panels 44, 46 and 70 are formed of treated plywood for the same purpose. This is also true of runners 58 and rails or sideboards 74 for the roof subassembly 20. The presence of the rods 22 and 24 in contact with or in the vicinity of trough bottom and front boards 26 and 56 function to provide rigidity and strength in areas of maximum abuse and contact by the animals. The rods 22 functioning as a barrier to limit hand contact and possible destruction of the feeder. This completes the trough construction and, in fact, achieves the assembly of the sidewall and rear wall subassemblies of the housing for the feeder without the need of nails or the like. The trough is provided at an "deep in" location, thereby eliminating the need for the weather vane and pivoting arrangement to keep the trough and its mineral or salt content out of the weather. The panel subassemblies for the sides and back prevent the caking of salt and minerals that normally comes about by exposure to damp "night air" or extremely humid conditions as occurs in the more open type feeders. The use of treated plywood particularly for the roof panel, eliminates sheet metal rusting which shortens the life of conventional feeders. The beveled tops or edges of the trough side and back boards prevents the salt from collecting at the point of contact with the respective side and rear panels which tends to attract moisture and which is detrimental to the plywood skin. The bevel of the front board prevents rain water from falling on top of the 2×12 and running back towards the trough area.

Further, by having the edge of the side and rear panels raised from the runners along the overhang of the roof at its forward or open end, the air deflects from front to rear, under the trough 30, and not into the upper closed off area, minimizing the caking of salt within the trough 30.

Referring to a second aspect of the present invention, conventionally strips of material with one end dipping in a container of liquid medicament, insecticide, or the like, permits such medicament or insecticide solution to be applied directly to the sides of an animal's face around the eyes to nrevent "face fly" infestation and lice build-up around the animal's eyes. Typically, a container is suspended some distance from the ground, and strips of cloth or the like whose upper ends dip in the interior of the solution borne interiorly of the container cause the solution to move by capillary action through the strip, wetting the strip and thus contacting the animal's face in the vicinity of the area needing the insecticide solution treatment. This invention provides, as a part of a feeder, a face fly applicator device, which may also be used independently thereof.

The present invention involves the utilization of an improved face fly applicator device, as indicated at 12. The device 12 comprises an elongated hollow cylindrical container 95, formed for instance, FIG. 5, from a plastic tube or pipe as at 94, the ends of which may be closed off by means of a threaded caps as at 96 bearing threads 98 which thread to a threaded end portion 94a of tube 94. Preferably, an annular seal 100 is interposed between the threaded cap 96 and tube 94, the seal may be partially recessed within a groove 102 adjacent the threads 99 of tube 94 and a recess 104 within the periphery of cap 96. The cap 96 is provided with a finger grip portion 96a within a recessed central portion 96b on the face of the cap 96, so as to permit the cap 96 to be threaded to the tube 94 at one or both ends. By removal of the cap 96, access may be had to the interior of the tube 94.

Internally of the tube 94, there is provided a feeder wick 106 constituting a length of cotton rope or the like, which by gravity is maintained in the bottom of the cavity formed by the hollow tube 94. The insecticide in liquid form fills the interior of the tube 94. By removing a filling cap such as cap 108 which is threaded to opening 110 within the tube 94 at the top thereof, the cap 108 projecting through a hole 112 within the roof panel 70, access may be had to the hole 110 for filling of the tube interior. Preferably, two U-bolts as at 114 are employed for mounting the container 95 defined by tube 94 and end caps 96 to the roof panel 70, on its under side, and within the frental overhang of the roof panel. The U-bolts 114 are threaded at their ends as at 114a and bear nuts 116 and washers 118 to lock the tube 94 to the roof panel at points adjacent the sidewall subassemblies 14, 16.

In order to insure that regardless of whether the animal enters the interior of the feeder straight in or obliquely, the improved treatment device or applicator device 12 employs a plurality of applicator or liquid treatment wicks 120 which are formed of cotton rope or the like, and which hang down on opposite sides of the tube 94. Opposite side wicks 120 are preferably integral so that respective ends project outwardly of the tube 94 through opposed holes 122. 124 at the top of the tube 94 and at opposite sides of the longitudinal center line. A series of holes 122 are provided in a row along one side of the tube 94 and a second series of holes 124 are provided on the opposite of the tube 94 with the holes of the series being in line with each other. The applicator wicks 120 have their central portions 120a well within the liquid L, FIG. 2, with their centers underlying or bed to the feeder wick 106 as at 128. The treatment wicks 106 are normally self maintained in position with respect to the feeder wick although they may be tied thereto by string as at 124, FIG. 5. Alternatively, an assembly may be made by knotting the center of each applicator wick 120 to the feeder wick 106 at longitudinally spaced positions over the length of the same in the manner evident in FIG. 5, with the exception that the feeder wick 106 in the illustrated embodiment is tied to the applicator wicks in the illustrated embodiment. The applicator wicks 120 may be knotted on itself inside the tube 90 and at a point adjacent to holes 122 and 124 to prevent the rope 120 from being pulled from the tube 90. The spacing of the applicator wicks and thus the spacing of holes 122 and 124 longitudinally of tube 94 is such that it is impossible for a bovine creature to place his head in the interior of the feeder at the trough 30, except by brushing across either or both of the free hanging portions of the individual applicator wicks 120 as they extend downwardly along each side of tube 94. It is the combined design of the feeder proper and the mounting of the "face fly" applicator device that assures that the animal will be properly treated for face flies every time the animal consumes some salt/mineral mixture within trough 30. The feeder wick 106 lying in the bottom of the tank defined by tube 90 to which the individual applicator wicks 120 are fastened, or have contact therewith, insures an even flow of liquid to all of the applicator wicks even when the feeder sets on the ground at an angle as a result of unlevel ground and/or when the solution is nearly depleted within the interior of tube 94. While threaded cap 96 permits access to the interior of tube 94 and thus the storage tank for the liquid, it is envisioned that a unit may be devised in which access is denied and wherein end plugs are sealed to be tube 94 by thermal welding or the like, without permitting replacement of feeder wick 106 or access to the connections between the feeder wick 106 and the applicator wicks 120.

While the invention has been particularly shown and described with reference to a preferred embodiment thereof, it will be understood by those skilled in the art that various changes in form and details may be made therein without departing from the spirit and scope of the invention.

What is claimed is:

1. A knock down salt and mineral feeder for cattle and the like, said feeder comprising:
   two oppositely facing sidewall subassemblies,
   a rear wall subassembly,
   each sidewall subassembly comprising:
   front and rear vertical posts,
   an elongated trough sideboard spanning between said posts and mortise and tenon connected thereto at respective ends thereof,
   said rear posts bearing a vertical mortise slot on an inside face thereof,
   a horizontal mortise slot within the inner face of said trough sideboard and extending forwardly from a rear edge thereof and including a horizontal mortise slot extension portion within said rear post intersecting with said vertical mortise slot,
   an inclined mortise slot within said trough sideboard and extending from said horizontal mortise slot at the forward end thereof to the top of said trough sideboard and being inclined upwardly and outwardly towards said front post,
   a side panel fixed to the outside of said front and rear posts and said trough sideboard and extending from the top of said posts to the bottom of said trough sideboard,
   said rear wall subassembly comprising:
   a rear panel corresponding in height to that of said sidewall subassembly side panels,
   a trough rearboard fixed to the inside of said rear panel, being coplanar therewith and extending across a portion of said rear panel and terminating in tenons at each end thereof and fitted to said rear post vertical mortise slots, said rear panel being of a length and positioned such that the ends of said rear panel overlap the ends of said respective side panels, said trough rearboard including a horizontal mortise slot within the inner face thereof near the bottom of said trough rearboard, a trough bottom board having a longitudinal edge fitted within said horizontal mortise within said rear board and ends fitted within said horizontal mortise slots within said side boards, and rods extending through said sidewall assemblies at said trough sideboards, and nuts threaded to the ends of said rods outside of said side wall subassemblies side panels to lock said sidewall subassemblies to said rear wall subassembly with said trough bottom and front boards within respective mortise slots to form, with said trough sideboards and rearboard, an upwardly open salt and mineral trough at the rear of said feeder and remote from an open front thereof integrated with said sidewall and rear wall assemblies, said feeder further comprising a roof subassembly, said roof subassembly comprising:

a rectangular roof panel having a lateral width in excess of the width of said rear wall subassembly rear panel, a pair of sideboards extending along the lateral side edges of said roof panel and being fixed to the bottom of said roof panel, and means for bolting said sideboards to the upper ends of said posts, with said roof panel overhanging the open front of said feeder, thereby permitting quick and easy on site assembly of said feeder, while permitting shipment of said feeder as stacked components in compact fashion, prior to onsite assembly.

2. The knock down salt and mineral feeder for cattle and the like, as claimed in claim 1, wherein said rods underlie respectively said trough bottom board and said trough front board intermediate of their ends so as to reinforce said trough portion of said feeder, while preventing unimpeded contact by the feeding animal with said trough boards and possible destruction of the feeder itself.

3. The knock down salt and mineral feeder for cattle and the like, as claimed in claim 1, wherein the upper edges of the trough sideboards and the trough rearboard are beveled downwardly and inwardly towards the interior of the trough to resist accumulation and caking of salt and minerals and subsequent rotting out of said boards or the panels adjacent thereto.

4. The knock down salt and mineral feeder for cattle and the like, as claimed in claim 2, wherein the upper edges of the trough sideboards and the trough rearboard are beveled downwardly and inwardly towards the interior of the trough to resist accumulation and caking of salt and minerals and subsequent rotting out of said boards or the panels adjacent thereto.

5. The knock down salt and mineral feeder for cattle and the like, as claimed in claim 1, further comprising a tubular face fly insecticide liquid applicator device mounted to said roof subassembly beneath said roof panel and in front of the front posts of said sidewall subassemblies, said tubular container extending horizontally and bearing a liquid insecticide internally thereof, the improvement comprising:

a feeder wick extending longitudinally within the interior of said tubular container along the bottom thereof from one end to the other, a plurality of longitudinal aligned holes within the top of said container to each side thereof, along the full length thereof, and an applicator wicks having ends projecting interiorly of said container through respective holes and being in contact with said feeder wick and having free ends disposed on respective sides of said container and extending downwardly therefore across the open front of said feeder, such that regardless of lateral inclination of said feeder and said tubular container or depletion of liquid, liquid is fed by capillary action within said feeder wick to said applicator wicks and within respective applicator wicks on each side of said container to provide an array of wicks preventing entry of the feeding animal into the interior of the feeder and access to the content of the trough without said applicator wicks sweeping across the face of the feeding animal in the vicinity of the eyes for treatment thereabout.

6. The knock down salt and mineral feeder for cattle and the like, as claimed in claim 5, wherein said applicator wicks for laterally aligned holes, on respective sides of said tubular container, are unitary with the center of said applicator wicks underlying and in contact with said elongated feeder wick.

7. The knock down salt and mineral feeder for cattle and the like, as claimed in claim 5, wherein said applicator wicks are tied to said feeder wick in the vicinity of said holes through which their free ends protrude.

8. The knock down salt and mineral feeder for cattle and the like, as claimed in claim 5, further comprising a pair of U-bolts projecting through said roof subassembly, surrounding said tubular container at respective ends thereof, bearing threaded ends and nuts threaded to the ends of said U-bolts for locking said tubular container to the bottom of said roof panel, and wherein said tubular container comprises at least one feed hole within the top of the same and said roof panel comprises a hole aligned with the feed hole within said tube and a cap projecting through the hole within said roof and being threaded to said opening to close off access to the interior of said container during normal use but permitting refilling of liquid within said container.

* * * * *